United States Patent [19]

Murai et al.

[11] 4,183,748

[45] Jan. 15, 1980

[54] METHOD OF REMOVING SURFACE IONIC IMPURITIES ON INORGANIC PHOTOCONDUCTIVE MATERIAL

[75] Inventors: Keiichi Murai, Tokyo; Takehiko Matsuo, Kawasaki, both of Japan

[73] Assignee: Canon Kabushiki Kaisha, Tokyo, Japan

[21] Appl. No.: 838,376

[22] Filed: Sep. 30, 1977

Related U.S. Application Data

[63] Continuation of Ser. No. 381,403, Jul. 23, 1973, abandoned.

[30] Foreign Application Priority Data

Jul. 29, 1972 [JP] Japan .................................. 47-76145

[51] Int. Cl.[2] ......................... G03G 5/08; B01D 15/00

[52] U.S. Cl. .................................... 430/135; 423/501; 210/24; 423/561 R; 423/561 B; 423/509; 430/87; 430/94; 430/84

[58] Field of Search ........................... 423/501; 96/1.5; 210/24

[56] References Cited

U.S. PATENT DOCUMENTS

| | | | |
|---|---|---|---|
| 2,678,885 | 5/1954 | Porter | 210/24 R |
| 2,693,416 | 11/1954 | Butterfield | 96/1.4 |
| 3,635,705 | 1/1972 | Ciuffini | 96/1.5 |

OTHER PUBLICATIONS

"Ion Exchange" The Condensed Chemical Dictionary.
Ion Exchange Separations in Analytical Chemistry, Samuelson, 1963, pp. 52, 53, 163.

*Primary Examiner*—Roland E. Martin, Jr.
*Assistant Examiner*—John L. Goodrow
*Attorney, Agent, or Firm*—Fitzpatrick, Cella, Harper & Scinto

[57] ABSTRACT

This invention is directed to photosensitive material for electrophotography and more particularly it is directed to the improvement of the properties with respect to humidity of photosensitive material by using photoconductive material in combination with ion exchange resin or by using photoconductive material which is previously washed in an aqueous solution in the presence of ion exchange resin.

6 Claims, No Drawings

METHOD OF REMOVING SURFACE IONIC IMPURITIES ON INORGANIC PHOTOCONDUCTIVE MATERIAL

This is a continuation, of application Ser. No. 381,403 filed July 23, 1973 now abandoned.

BACKGROUND OF THE INVENTION

It is well known that photoconductive materials such as $Cu_2O$, CuI, ZnO, ZnS, ZnSe, CdS, Se-Te, CdSe, CdTe, PbS, $Sb_2S_3$, $In_2Te_3$, GeS, GeSe, $Tl_2S$ and the like are dispersed in thermosetting resins such as epoxy resin, unsaturated polyester resin and the like, or thermoplastic resins such as vinylchloride-vinylacetate copolymer, polyvinylchloride, polyvinylacetate, cellulose acetate, cellulose nitrate, polyacrylate, polyvinylalcohol, polyvinylbutyral and the like to form photoconductive layers for electrophotography. Where an electrostatic latent image is produced using the photoconductive layer, electrostatic potential difference between the light portion and the dark portion of the latent image is extremely reduced under the conditions of high temperature and high humidity, thereby making it very difficult to form distinct images. It is thought that this phenomenon occurs due to the fact that the photoconductive layer absorbs moisture under the conditions of high temperature and high humidity and loses the characteristics of a photoconductive layer.

Referring to cadmium sulfide as a photoconductive particle, it is activated through doping by copper in the production thereof and, in this case, since the metallic salts added are present in the neighborhood of the surface of cadmium sulfide crystal or attached to the outer surface of the crystal, they should be removed by washing. However, such metallic salts cannot be completely removed by simple washing and a very small amount of the salt attaches to the outer surface of the cadmium sulfide crystalline particle. It is considered that the reduction of the characteristics of the photoconductive layer is caused by the interaction of the absorption of moisture by such salt's ion and the increase in electric conductivity as the result of the absorption of moisture.

As a matter of fact, it has been confirmed from the measurement of the amount of remaining ion that the conventional cadmium sulfide shows high electrical conductivity. Since the amount of remaining ion can not directly be measured, there is usually employed for the purpose a method in which the remaining ion is extracted from cadmium sulfide under a certain condition and electric conductivity of the extract so obtained is measured. According to this method, electric conductivity of cadmium sulfide is measured and the result is as follows.

For instance, 10 g of CdS is dispersed in 100 ml of pure water treated with ion exchange resin (electric conductivity below 1.0 $\mu\Omega$/cm, 20° C.) and after the dispersion is boiled for two minutes, it is percolated to separate CdS. The thus-obtained liquid extract is cooled and the electric conductivity thereof is determined at the reduced temperature of 20° C., which shows electric conductivity of the order of 30 to 50 $\mu\Omega$/cm, but not below 30 $\mu\Omega$/cm at all.

According to the conventional washing method, there can be obtained only CdS containing the remaining ion which shows electric conductivity of more than 30 $\mu\Omega$/cm by the above measurement. Thus, the resistance and the electrostatic voltage contrast between light and dark portions of the photoconductive layer are reduced at high temperature and the photoconductive properties with respect to humidity (resistivity to humidity) are reduced. Particularly, where the amount of remaining ion exceeds 50 $\mu\Omega$/cm by the above measurement, high electric conductivity due to the remaining ion appears, thereby reducing the contrast even though CdS is maintained at room temperature in the silica gel atmosphere for a week.

This phenomenon occurs where the electrostatic latent image is formed directly on a photoconductive layer and also where the electrostatic latent image is formed on an insulating layer provided on the photoconductive layer, thereby reducing the contrast of the latent image. Particularly, the photosensitive member in which an insulating layer is provided on the photoconductive layer and which is required for excellent capability to trap electric charges because the trapped electric charge in the photoconductive layer affects directly the latent images, is liable to lose such capability to trap electric charges at high temperature and high humidity, which results in low contrast.

SUMMARY OF THE INVENTION

It is an object of this invention to provide improved photoconductive particles, photoconductive properties of which are not deteriorated even under the conditions of high temperature and high humidity.

It is another object of this invention to provide improved photoconductive layers which are produced by dispersing the improved photoconductive particle in a binder.

It is a further object of this invention to provide improved photosensitive plates which are capable of producing stable images even under the conditions of high temperature and high humidity.

The above and other objects and advantages of this invention will become apparent from the following explanation.

Briefly, the feature of this invention resides in the removal of salt ions which are present in the neighborhood of the photoconductive particle or attached to the outer surface of the photoconductive particle by treating the photoconductive particles in an aqueous solution in the presence of an ion exchange resin, and this invention enables the photoconductive layer to retain its photoconductive properties even under the conditions of high temperature and high humidity.

DESCRIPTION OF THE PREFERRED EMBODIMENT

This invention is directed to the removal of ionic impurities, which cause the reduction of photoconductive properties due to temperature and humidity, by washing the photoconductive particles in the presence of an ion exchange resin in an aqueous solution.

The ion exchange resin herein used may be either an anion exchange resin or a cation exchange resin. The ion exchange resin may be used in the range of approximately ½ to 1/10 part by weight per 1 part by weight of photoconductive particle to control the remaining ion and the electric conductivity of the photoconductive particle, with approximately 1/5 part by weight being most preferred. The aqueous solution, if possible, needs to be pure water free of ion impurities. The washing is effected for the period of from several minute to several tens minutes. The control of electric conductivity can be effectively achieved by selecting appropriately the period of washing and the amount of ion exchange resin. Where the amount of ion exchange resin is, as stated above, approximately 1/5 part by weight, the washing period is preferably approximately 15 minutes.

The photosensitive plate wherein there is employed photoconductive particle whose remaining ion concentration is reduced by washing in the presence of an ion exchange resin to give an electric conductivity value of below 10 μΩ/cm retains, even when allowed to stand for 16 hours at 35° C., 85% R.H. (not at ambient humidity), a contrast of more than 90% as compared to when kept at silica gel dry condition, and thus it is commercially suitable. Particularly, when the electric conductivity of the photoconductive particle (as determined by measuring the conductivity of the liquid after washing) is reduced below 2 μΩ/cm, the photosensitive plate using each photoconductive particle, even when allowed to stand for more than 16 hours at 35° C., 100% R.H. can retain a contrast of more than 95% as compared to when kept at ambient humidity and it shows very excellent properties with respect to humidity. The control of electric conductivity is measured by the factors of the amount of ion exchange resin, washing period and so on and also is affected by the kind of photoconductive particle itself. As the photoconductive particle suitable for such purpose, not only CdS simple body but such particles as stated in the introductory portion of this specification can be employed and particularly CdSe, ZnS, (Cd.Zn)S, CdS.CdSe, etc., as well as CdS which inherently contains the remaining ion due to the activation process, are advantageously employed.

It will be noted that when cadmium sulfide activated by copper is merely dispersed in pure water, the water shows high electric conductivity of 70 μΩ/cm to 400 μΩ/cm.

The photoconductive particles produced according to this invention are dispersed in a resin binder to form a photoconductive layer, which is further provided with an insulating layer to form a photosensitive plate. The electrostatic contrast between the light and dark portions of the thus-prepared photosensitive plate is measured as follows.

The photosensitive plate is maintained at a temperature of 30° C. and a relative humidity of 85%. Corona discharge of +6 KV is applied to the plate to provide surface potential of +2 KV thereon. Additionally, corona discharge of AC 6 KV is applied to the plate while at the same time the plate is exposed to light of 2.5 Lux·sec. The plate (light portion) shows a surface potential of −150 V. On the other hand, in the same manner, corona discharge of +6 KV is applied on the photosensitive plate to obtain surface potential of +2 KV thereon. Additionally a corona discharge of AC 6 KV is applied thereto without the plate being exposed to the light. The plate (dark portion) shows a surface potential of +500 V. Therefore, the potential difference between the dark portion and the light portion contrast is 650 V. Contrarily, when the aforementioned procedure is applied at the aforementioned temperature and humidity on the photosensitive plate using photoconductive particles produced in the conventional manner, not using ion exchange resin, the potential difference is lowered by approximately 50% of that of this invention. When the photosensitive plate of this invention is kept at normal temperature and humidity and the same procedure as stated above is applied on the photosensitive plate, the potential difference is approximately 700 V. This shows that the photoconductive particles of this invention are scarcely affected by temperature, humidity and so on. As is apparent from this fact, the photoconductive particles of this invention are scarcely affected by temperature and humidity and are capable of showing a contrast which is more excellent than that of the conventional particle. Although the same procedure is repeated thirty thousand, there cannot be found any change of the contrast and any reduction of the contrast at high temperature and high humidity, which shows the photosensitive plate of this invention to be commercially suitable.

For the production of the photoconductive particles of this invention, almost all the photoconductive particles are employed and the aforementioned thermosetting and thermoplastic resins are employed as a binder for production of the photoconductive layer. As an insulating layer, ordinary insulative resins such as polycarbonate, polyethylene, polypropylene, polystyrene, polyurethane, polyester and the like may be used and when applied by dip-coating method, two liquid type of polyurethane, photocurable acrylic resins, photocurable polyester resins, photocurable epoxy resins are used to form a layer having an uniform thickness of 20 to 40μ.

It should be noted that where the photoconductive particles are dispersed in a resin binder to form a photoconductive layer and a latent image is produced on the photoconductive layer, the photoconductive layer may afford stable and high contrast even at high temperature and high humidity.

It is to be noted that the photoconductive material may be used in combination with ion exchange to prepare a photoconductive layer, which is also in the scope of this invention.

The following examples are shown by way of illustration of this invention.

EXAMPLE 1

One part by weight of cadmium sulfide powder was dispersed in 5 parts by weight of pure water, and 1/5 part by weight of Amberlite anion exchange resin IRA-410 ($OH^-$ type) was also added. After the dispersion was stirred for 15 minutes, cadmium sulfide was separated from the ion exchange resin to obtain cadmium sulfide and a filtrate having an electrical conductivity of below approximately 10 μΩ/cm, which was dried by heating for 6 hours at 70° C. 10 parts by weight of cadmium sulfide so obtained and 5 parts by weight of vinylchloridevinylacetate copolymer (V-I manufactured by Morikawa Ink Co. Ltd.: solvent MIBK, solid content 20%) was sufficiently mixed with a blender to produce a paint of photoconductive material. The thus-prepared photoconductive material was coated seamlessly and uniformly on an aluminum cylinder by a dip-coating method to give a photoconductive layer whose thickness was 40μ when dried. After the layer was dried at 80° C. for 20 minutes it was coated by dipping into a 10% aqueous gelatin solution (Gelatin manufactured by Nitta Co. Ltd.) to obtain a clearcoling layer whose thickness was 2μ. After the layer was dried at 80° C. for 20 minutes, photocurable resin CK-4 (manufactured by Kansai Paint Co. Ltd.: diluted with EtOH, viscosity of 100 C.P.S.) was coated on the clearcoling layer by a dip-coating method at the rate of 40 cm/min, exposed to the irradiation of National High Pressure Mercury Lamp for photo-polymerization (HTQ-2000 2 KW×1) at the distance of 25 cm for 4 minutes and was cured while rotating the aluminum cylinder. When the same procedure was repeated three times, a seamless cylindrical photosensitive plate for electrophotography having an insulating layer whose thickness was 35μ was completed. Corona-discharge of +6 KV was applied to the photosensitive plate so prepared to provide a surface potential of +2 KV. Then AC 6 KV was applied thereto, while at the same time the whole surface was exposed to light of 2.5 Lux·sec. The surface potential of the photosensitive plate was measured to be −150 V. On the other hand, when the whole surface was not exposed to light at the same time, the surface potential was measured to be +500 V and the electrostatic contrast between the dark and light portions was 0.50 V.

When the electrostatic contrast between the dark and light portions was measured after the photosensitive plate was allowed to stand at 35° C. and at high humidity of 85%, it was found that there was no reduction of the contrast.

When the electrostatic latent image formed in accordance with the same procedure was developed with wet or dry developing method, a sharp image was obtained which was of high contrast.

EXAMPLE 2

One part by weight of Cu-activated cadmium sulfide powder produced according to the conventional method, 5 parts by weight of pure water and further 1/5 part by weight of Amberlite anion exchange resin IR-4B ($OH^-$ type) were mixed. After the mixture was stirred for 20 minutes, cadmium sulfide was separated from the ion exchange resin to obtain cadmium sulfide and a filtrate having the same electric conductivity as in EXAMPLE 1. After drying at 100° C. for 12 hours cadmium sulfide was mixed with a resin binder in the same manner as in EXAMPLE 1 to prepare a paint for the photoconductive layer. The paint was applied on an aluminum foil whose thickness was 50μ according to a roll-coating method to form a photoconductive layer whose thickness was 30μ when dried. Then the layer was dried at 80° C. for 30 minutes and Luminer of 25μ thickness (polyester film manufactured by Toray Co. Ltd.) was coated thereon using an adhesive of DB-9A04 (Diabond Co. Ltd.), and after it was dried at 80° C. for 5 minutes, it was laminated under pressure to produce a photosensitive plate for electrophotography. As in EXAMPLE 1, corona discharge of +6 KV was applied to the photosensitive plate so produced to provide +2 KV of surface potential of the photoconductive layer. Corona-discharge of AC 6 KV was applied thereto while at the same time the whole surface was exposed to light of 2.5 Lux·sec. The contrast of electrostatic potential between the plate which was exposed to light as mentioned above and an other plate which was not exposed to light was determined to be 650 KV. When the photosensitive plate was placed at 35° C. and at high humidity of 85%, there could not be found any reduction of contrast, and when the latent image was developed with dry or wet developing method and transferred to paper a sharp image was obtained which was of high contrast.

EXAMPLE 3

One part by weight of Cu-activated cadmium sulfide produced according to the conventional method, 5 part by weight of pure water and ¼ parts by weight of Amberlite cation exchange resin IR-120 ($H^+$ type) were mixed. After the mixture was stirred for 15 minutes, cadmium sulfide was separated from the ion exchange resin and then it was dried by heating at 60° C. for 12 hours. As in EXAMPLE 1, a paint is produced from cadmium sulfide so produced and a resin binder, which was applied on an aluminum cylinder as in EXAMPLE 1, followed by coating of clearcoling layer and insulating layer to produce a photosensitive plate.

When the photosensitive plate so produced was subjected to the same test as in EXAMPLE 1, it was found that there could not be found any reduction of contrast due to high temperature and high humidity and that the image was excellent.

EXAMPLE 4

One part by weight of Cu-activated cadmium sulfide powder produced according to the conventional method, 5 parts by weight of pure water and 1/10 parts by weight of each of Amberlite anion exchange resin IRA-410 ($OH^-$ type) and cation exchange resin Amberlite IR-120 ($H^+$ type were mixed and after the mixture was stirred for 15 minutes, cadmium sulfide was separated from the ion exchange resin. After the cadmium sulfide was dried by heating at 70° C. for 6 hours, it was mixed with a resin binder as in EXAMPLE 1 to form a paint. The paint, was applied onto an aluminum foil whose thickness was 50μ to form a photoconductive layer and then an insulating layer was provided on the photoconductive layer to form a photosensitive plate. As in EXAMPLES 1, 2 and 3, there could not be found any reduction of electrostatic contrast at high temperature and high humidity, and the image quality was excellent.

EXAMPLE 5

One Kg of cadmium sulfide which was produced according to the conventional method and was activated by copper, was dispersed in 5 l. of pure water whose electric conductivity was 0.8μΩ/cm. The dispersion was stirred and the electric conductivity thereof was mesured, which showed electric conductivity of 180μΩ/cm. 60 ml of ion exchange resin Amberlite IR-120B and 140 ml of IRA-400 were added therein. After the mixture was stirred for 15 minutes, the electric conductivity of water was measured, which showed it dropped to 5μΩ/cm. This shows that chlorine ion, copper ion, sulfate ion and the like liberated from the surface of the cadmium sulfide were absorbed on the ion exchange resin. It has been confirmed that a photosensitive plate in which there is employed photoconductive particles washed in the presence of an ion exchange resin and which was produced according to the same method as described above did not show any change of contrast and sensibility even after being allowed to stand at high humidity of 85% and at high temperature of 35° for 24 hours and further showed good resistivity to deterioration due to charge.

EXAMPLE 6

In this example, photoconductive particles whose filtrate after dispersion in pure water had various electric conductivities were employed and compared.

Cu-activated CdS was washed to remove remaining ion and to adjust the electric conductivity thereof to 8.5μΩ/cm by the afore-mentioned measurement. 100 parts by weight of CdS so obtained was dispersed in 50 parts by weight of V-I clear (Trade name: manufactured by Morikawa Ink Co. Ltd.) and they were blended in a three rod roll mill to form a paint. The paint was applied on an aluminum foil whose thickness was 50μ by knife-coating to prepare a photoconductive layer having the thickness of 30μ, which was further provided with a polyester film whose thickness was 25μ to prepare a photosensitive plate of three layer construction. The thus-obtained photosensitive plate was referred to as Sample A.

By repeating the washing of removing ion according to the aforementioned method, a CdS solution having an electric conductivity of 1.8 μΩ/cm was prepared, and the CdS was used in producing a photosensitive plate in the same manner as described above. The thus-obtained photosensitive plate was referred to as Sample B. On the other hand, conventional CdS, whose electric conductivity was measured to be approximately 43 μΩ/cm, was employed to produce a photosensitive plate in the aforementioned manner. The thus-obtained photosensitive plate was referred to as Sample C. Incidentally, a photosensitive plate was prepared in the same manner as Sample A except that as the binder, 25 parts by weight of LR472 (Trade name: manufactured by Mitsubishi Rayon Co. Ltd.) was used per 100 parts by weight of CdS. The thus-obtained photosensitive plate was referred to as Sample D.

When the electrophotographic method as stated in EXAMPLE 1 was applied to Samples A, B, C and D, the following results were obtained.

| Sample | Dark (V) | Light (V) | Contrast (V) | Image | Condition |
|---|---|---|---|---|---|
| A | 410 | −50 | 460 | good | Silica Gel |
| B | 430 | −60 | 490 | " | Atmosphere |
| C | 410 | −40 | 450 | " | |
| D | 490 | −60 | 550 | " | |
| A | 390 | −40 | 430 | good | |
| B | 440 | −60 | 500 | " | 35° C. 85% |
| C | 300 | −40 | 340 | somewhat bad | 16 hours |
| D | 440 | −70 | 510 | good | |
| A | 280 | −50 | 330 | somewhat bad | |
| B | 410 | −70 | 480 | good | 35° C., 100% |
| C | 120 | −30 | 150 | bad | 16 hours |
| D | 250 | −60 | 310 | somewhat bad | |

The photosensitive plate (Sample C) in which the conventional CdS not improved in the properties with respect to humidity was employed, as is apparent from the above table, showed a reduction of the properties thereof even at the condition of 35° C., 85% and 16 hours. On the other hand, Samples A and D in which the photoconductive particle having electric conductivity of below 10μΩ/cm was employed provided good images under all the conditions. Particularly, when Sample B whose electric conductivity was below 2 μΩ/cm. was employed, there could be obtained an excellent image even at the condition of 35° C., 100% and 16 hours.

We claim:

1. A method of improving particles of an electrophotographic photoconductive material selected from the group consisting of $Cu_2O$, CuI, ZnO, ZnS, ZnSe, CdS, Se-Te, CdSe, CdTe, PbS, $Sb_2S_3$, $In_2Te_3$, GeS, GeSe, $Tl_2S$, (Cd.Zn)S, CdS.CdSe and CdS, which are rendered electrically conductive by exposure to actinic radiation, by removing substantially all surface ionic impurities which might cause deterioration of the photoconductive properties of the particles due to temperature and humidity conditions, said method comprising the steps of washing said particles in an aqueous solution containing at least one type of ion exchange resin to solubilize said ionic impurities from the surface of said particles and then separating said particles from said solution.

2. A method according to claim 1, wherein said electrophotographic photoconductive material is selected from the group consisting of CdS, CdSe, ZnS, (Cd.Zn)S and CdS.CdSe.

3. The method of claim 1, wherein said washing is conducted for a period of time to reduce the electrical conductivity of said aqueous solution, after said washing, to below 10 μmho/cm.

4. The method of claim 3, wherein said aqueous solution comprises pure water substantially free of ionic impurities.

5. The method of claim 3, wherein the amount of ion exchange resin is from ½ to 1/10 part by weight per 1 part by weight of said photoconductive particles.

6. The method of claim 1, wherein said washing is conducted for a period of time to reduce the electrical conductivity of said aqueous solution, after said washing, to below 2 μmho/cm.

* * * * *